United States Patent [19]

Ohsawa

[11] 3,790,714

[45] Feb. 5, 1974

[54] FM STEREOPHONIC RECEIVER

[75] Inventor: Mitsuo Ohsawa, Kanagawa, Japan

[73] Assignee: Sony Corporation, Tokyo, Japan

[22] Filed: July 12, 1971

[21] Appl. No.: 161,437

[30] Foreign Application Priority Data

July 13, 1970 Japan ............................... 45/61153

[52] U.S. Cl. ............................................ 179/15 BT

[51] Int. Cl. ............................................ H04h 5/00

[58] Field of Search 179/15 BT; 325/348, 401, 402, 325/408, 456, 469, 478

[56] References Cited

UNITED STATES PATENTS

| | | | |
|---|---|---|---|
| 3,573,382 | 4/1971 | Feit | 179/15 BT |
| 3,634,626 | 1/1972 | Staley | 179/15 BT |
| 3,569,633 | 3/1971 | Brahman | 179/15 BT |
| 3,553,379 | 1/1971 | Boomgaard | 179/15 BT |
| 3,582,794 | 6/1971 | Smith | 179/15 BT |

*Primary Examiner*—Kathleen H. Claffy
*Assistant Examiner*—Thomas D'Amico
*Attorney, Agent, or Firm*—Lewis H. Eslinger, Esq.; A. Sinderbrand, Esq.

[57] ABSTRACT

A receiver for stereophonic program signals which employs a narrow-band intermediate-frequency signal extracting circuit and a noise signal detecting circuit for producing a gate signal. The receiver further includes a change-over switch which is controlled by the gate signal to select the monaural or stereophonic mode of operation so that the receiver may achieve monaural reproduction when noise in the received signal exceeds a predetermined level.

2 Claims, 4 Drawing Figures

INVENTOR.
MITSUO OHSAWA
BY

INVENTOR.
MITSUO OHSAWA
BY
Lewis H. Eslinger

INVENTOR
MITSUO OHSAWA
BY

FM STEREOPHONIC RECEIVER

BACKGROUND OF THE INVENTION

1. Field of the Invention

This invention relates to an FM stereophonic receiver, and more particularly to an FM stereophonic receiver which is provided with narrow-band intermediate-frequency signal extracting means and noise signal detecting means so as to effect monaural reproduction when the received signal is excessively noisy.

2. Description of the Prior Art

In the reception of a stereophonic signal by an FM stereophonic receiver, certain conditions are generally required for excellent reproduction of the stereophonic signal. One of these conditions is that the received input signal must have an amplitude level exceeding a predetermined reference value. When the amplitude of the received signal is of low level, its signal-to-noise ratio is deteriorated by surrounding noise or a noise signal generated in the receiver. For example, when the signal-to-noise ratio of the received signal is lower than 30dB, the noise is too strong to permit good stereophonic reproduction.

Another condition is that no external noise must get mixed in the reception of the stereophonic signal. A noise signal mixed in the received signal band causes beat signals that impair stereophonic reproduction.

Another condition is that stereophonic reproduction is achieved only in an optimum tuned condition of the receiver. In other words, when the receiver is improperly tuned, a tuning point is located at the shoulder of the band-pass characteristic of an intermediate-frequency amplifier, with the result that the intermediate-frequency signal is amplitude-modulated and therefore produces noise that impairs stereophonic reproduction.

Further, if there is another broadcasting wave having a frequency equal to, or even close to, that of a desired signal, tuning of the desired channel is difficult. Beat interference may occur, which would impair stereophonic reproduction.

Thus, the stereophonic reproduction can be degraded by various conditions. If stereophonic reproduction is attempted while beat interference occurs or noise is mixed with the received signal, the stereophonic reproduction is greatly deteriorated. In stereophonic reproduction the composite stereophonic signal is switched at 38KHz, so that a beat effect occurs with the switching signal to emphasize the interference. However, the influence of the interference can be alleviated by reproducing the received signal as a monaural signal.

To this end, when a weak stereophonic signal is received or a noise signal is mixed in the received signal, the receiver is switched from the stereophonic to the monaural mod of operation to reproduce the signal. There has heretofore been proposed a circuit capable of switching in response to a weak signal, or a noisy one, to change from stereophonic to monaural reproduction. In this case, the entire bandwidth component of the intermediate-frequency signal is extracted, so that when a noise signal exists at the upper and lower limits of the pass band of the amplifier, the switching operation from the stereophonic to the monaural mode of operation cannot be achieved smoothly.

Further, it is also possible that, in the reception of a weak stereophonic signal, the receiver may be switched from the stereophonic to the monaural mode of reception by detecting a noise component of a band higher than the upper limit of the composite stereophonic signal. In this case, the frequency characteristic of a discriminator outside of the upper band of the composite stereophonic signal often varies with each receiver and adjustment is required for each receiver.

With these prior art circuits, the weak signal or noise cannot be detected accurately.

SUMMARY OF THE INVENTION

The present invention is directed to an FM stereophonic receiver provided with a monaural-to-stereo change-over switch, which employs a circuit for extracting a signal of a band narrower that that of an intermediate-frequency. In addition, the receiver includes a noise signal detecting circuit and is so arranged that the monaural-to-stereo change-over switch is controlled by signals derived from the two circuits.

Accordingly, one object of the invention is to provide an improved FM stereophonic receiver.

Another object of this invention is to provide an FM stereophonic receiver which is adapted to operate as a monaural receiver when receiving a weak stereophonic signal.

A further object of this invention is to provide an FM stereophonic receiver which is adapted to operate as a monaural receiver when receiving a stereophonic signal having a noise signal mixed therein.

Still a further object of this invention is to provide an FM stereophonic receiver which employs a noise detecting circuit having such a hysteresis characteristic as to ensure that once the receiver has been switched to either one of the monaural and stereophonic modes of operation, the receiver will not be too easily switched to the other mode of operation, even if a noise signal level varies in the vicinity of the detecting level of the detecting circuit.

Others objects, features and advantages of this invention will become apparent from the following description taken in conjunction with the accompanying drawings.

DESCRIPTION OF THE PREFERRED EMBODIMENTS

Figure 1:
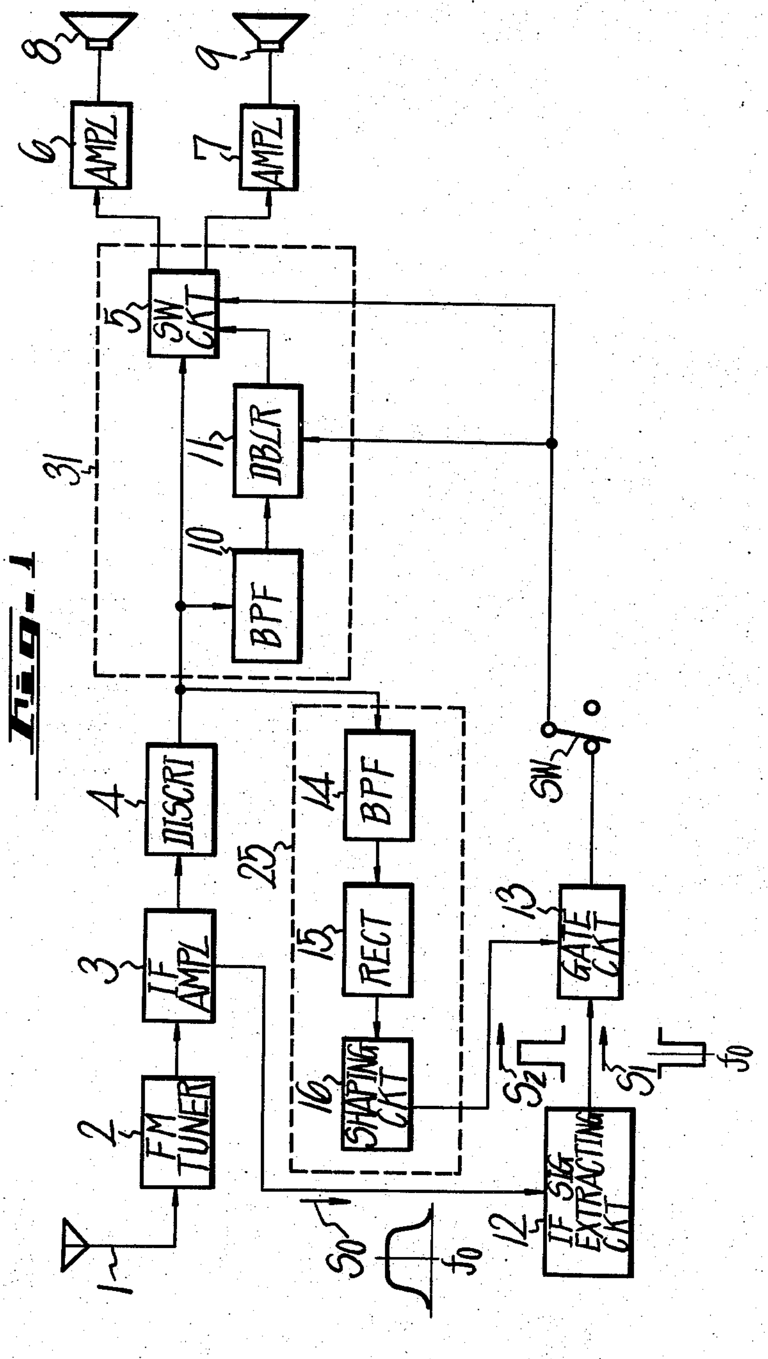
FIG. 1 is a block diagram showing one example of a stereophonic receiver of this invention.

FIG. 1 illustrates one example of an FM stereophonic receiver produced according to this invention and comprising an antenna 1, a tuner 2, an intermediate-frequency amplifier 3, and an FM discriminator 4. The output signal of the FM discriminator 4 is separated into right and left signals by a switching circuit 5 of an FM multiplex circuit 31 that includes means for selecting either the monaural or stereophonic mode of operation. The selected signals are then supplied to amplifiers 6 and 7, respectively. These amplifiers, in turn, supply the signals to suitable speakers 8 and 9.

One part of the output signal of the FM discriminator 4 is supplied to a band-pass filter 10 to extract a pilot signal of 19KHz from a composite stereophonic signal. This pilot signal is applied to a doubler circuit 11 to provide a subcarrier of 38KHz. The subcarrier is fed to the aforementioned switching circuit 5 in which the right and left signals are separated from each other.

Figure 2:
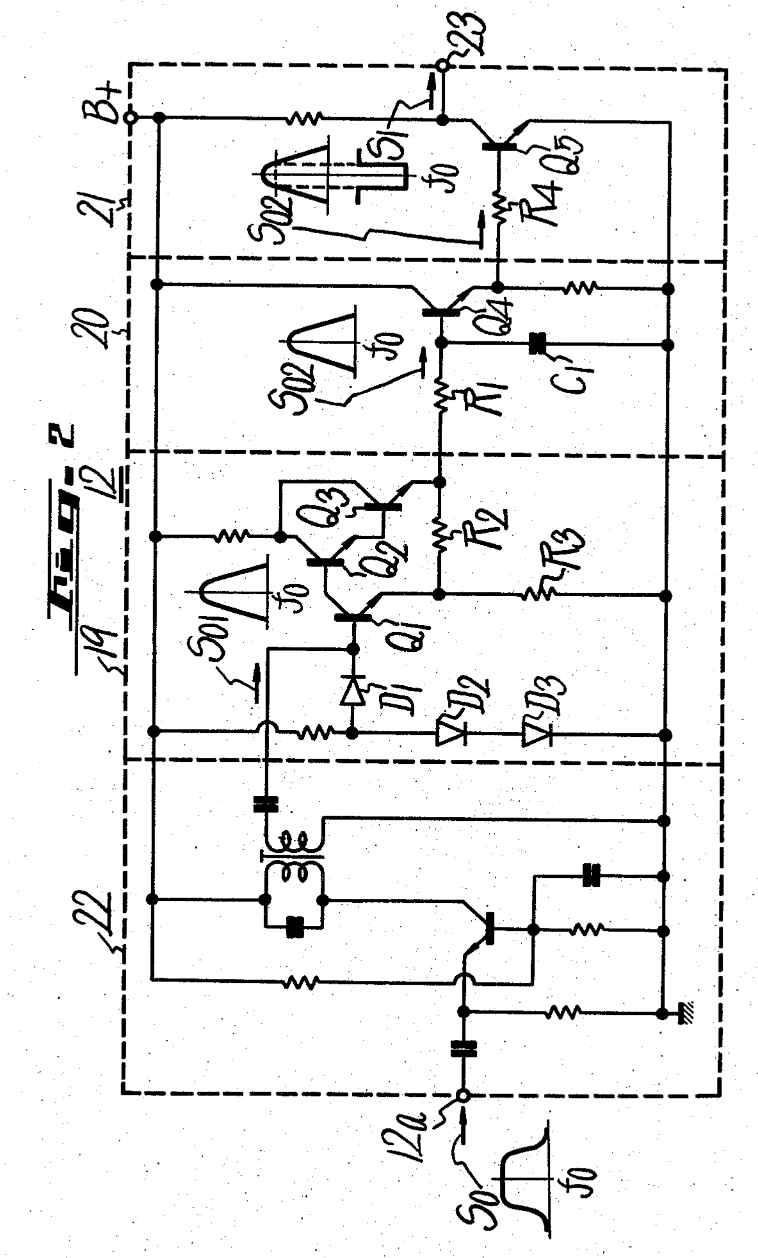
FIG. 2 is a schematic circuit diagram illustrating one example of a narrow bandwidth detector which is suitable for use in this invention.

In accordance with the present invention, a band-pass circuit 12 is connected to the output end of the intermediate-frequency amplifier 3. The circuit diagram of the band-pass circuit 12 is shown in FIG. 2. The functions of the band-pass amplifier 12 are to derive from the intermediate-frequency amplifier 3 an intermediate-frequency signal having a bandwidth lying within the straight-line range of the S-shaped characteristic curve of the FM discriminator 4 and to shape the intermediate-frequency signal to provide a first gate signal $S_1$. A fully amplitude-limited intermediate-frequency signal $S_O$ having a center frequency $f_O$ of, for example, 10.7MHz is supplied to an input terminal 12*a* from the intermediate-frequency amplifier 3 and is amplified by a narrow-band amplifier 22. Accordingly, an output voltage $S_{01}$, which has a peak value at a predetermined level at an optimum tuning point, is derived at the output side of the narrow-band amplifier 22, irrespective of the level of the signal received at the antenna 1.

The output signal $S_{01}$ of the narrow-band amplifier 22 is applied to a rectifier circuit 19 which is designed to function as a voltage multiplying rectifier due to a diode $D_1$ and the diode characteristic between the base and emitter of a transistor $Q_1$. The rectified output produced by the diode $D_1$ and the transistor $Q_1$ is amplified by transistors $Q_2$ and $Q_3$. Negative feedback resistors $R_2$ and $R_3$ cause the output of the rectifier circuit 19 to be proportional to the input thereto. Diodes $D_2$ and $D_3$ bias the base of the transistor $Q_1$ to hold it in such a biased condition as to be ready for conduction in the absence of the input signal thereto. The rectified output of the rectifier circuit 19 is fed to an integrating circuit 20 consisting of a resistor $R_1$ and a capacitor $C_1$. The output signal of the integrating circuit 20 is as indicated by $S_{02}$ in FIG. 2.

The signal $S_{02}$ derived from the integrating circuit 20 is supplied to the base of a transistor $Q_4$, connected as an emitter follower, and then fed through a resistor $R_4$ to the base of a transistor $Q_5$ making up a waveform converting circuit 21. Thus, when the level of the signal $S_{02}$ derived from the transistor $Q_4$ exceeds a predetermined value, for example, 0.6V, the transistor $Q_5$ conducts to derive the aforementioned gate signal $S_1$ from an output terminal 23 connected to the collector of the transistor $Q_5$. If the input signal is of low level, the signal $S_{02}$ will also be of low level, and the signal $S_1$ will not appear. Therefore, when receiving a weak signal, the circuit 12 does not operate.

Turning back to FIG. 1, the output of the FM discriminator 4 is connected to a noise detecting circuit 25 to produce a second gate signal $S_2$. The noise detecting circuit 25 is made up of a band-pass filter 14 permitting the passage therethrough of a signal having a frequency, for example, 200 to 500KHz higher than the higher harmonic component of the overall signal component of the composite stereophonic signal. The output of the filter 14 is connected to a circuit 15 having a hysteresis characteristic and operating according to a predetermined level of the output signal of the band-pass filter 14. The output of the circuit 15, in turn, is connected to a waveform shaping circuit 16. Since the band-pass filter 14 may be a conventional one, its detailed circuit construction will not be described.

Figure 3:
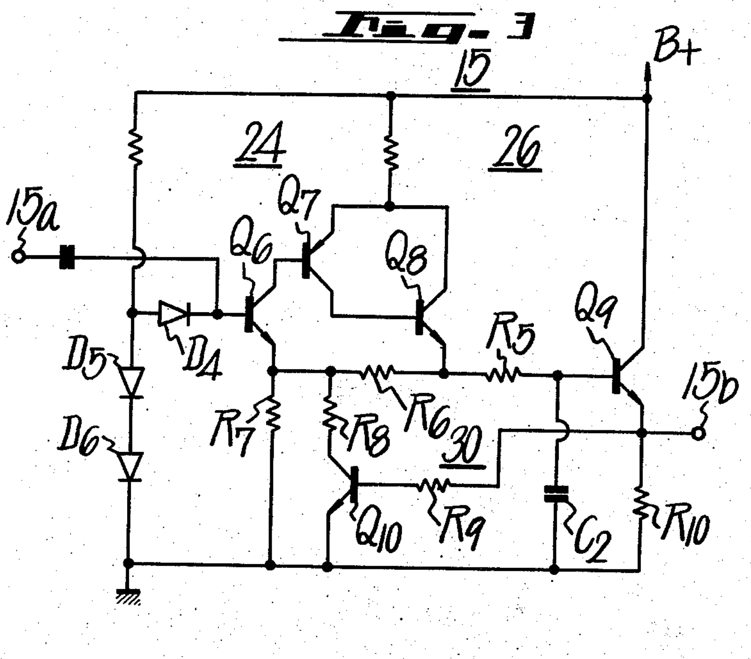
FIG. 3 is a schematic circuit diagram showing one example of one part of a noise detecting circuit which is suitable for use in this invention.

The circuit construction of the circuit 15 is shown in detail in FIG. 3. In the figure the output signal of the band-pass filter 14 is supplied to a rectifier circuit 24 through an input terminal 15*a*. The rectifier circuit 24 is designed to act as a voltage multiplying rectifier due to a diode $D_4$ and the diode characteristic between the base and emitter electrodes of a transistor $Q_6$. The rectified output signal is amplified by transistors $Q_7$ and $Q_8$ and then applied to the base of a transistor $Q_9$ connected as an emitter follower and having its emitter connected to an output terminal 15b. An integrating circuit 26, which consists of a resistor $R_5$ and a capacitor $C_2$, is connected between the transistors $Q_8$ and $Q_9$. Resistors $R_6$ and $R_7$ supply negative feed-back for rendering the output signal of the rectifier circuit 24 proportional to the input. Diodes $D_5$ and $D_6$ are used for biasing the base of the transistor $Q_6$ to hold it in such a condition as to be ready for conduction in the absence of the input signal thereto.

The circuit 15 further includes a gain control circuit 30 consisting of a resistor $R_8$, a transistor $Q_{10}$ and a resistor $R_9$. The resistor $R_8$ and the transistor $Q_{10}$ are connected in series with each other and in parallel with the resistor $R_7$. The base of the transistor $Q_{10}$ is connected to the emitter of the transistor $Q_9$ through the resistor $R_9$. The transistor $Q_9$ is connected as an emitter follower with an emitter load $R_{10}$.

Figure 4:
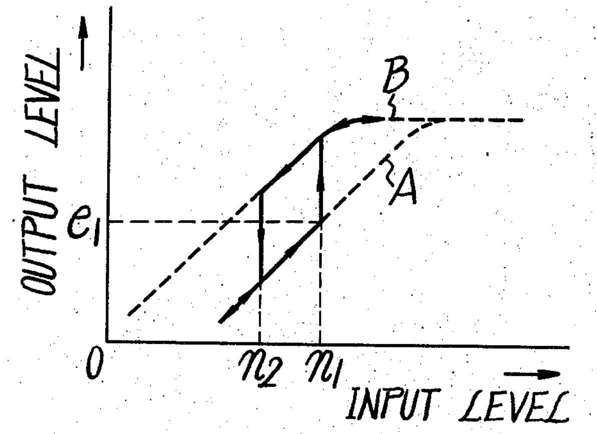
FIG. 4 is a graph showing its characteristic.

The operation of the circuit will be described with reference to the graph in FIG. 4. Insofar as operation with a noisy signal is concerned, the noise signal derived from the band-pass filter 14 is rectified by the rectifier circuit 24 and then smoothed by the integrating circuit 26 to produce an output at the terminal 15b. In the event that the level of the noise signal is so low as not to cause any trouble in stereophonic reproduction, for example, when the level of the noise signal is $n_2$ in FIG 4, no potential high enough to cause the transistor $Q_{10}$ to conduct is produced at the output terminal 15*b*, and accordingly the transistor $Q_{10}$ remains in its off state. In this case, the gain of the circuit 15 is dependent mainly upon the ratio of the resistance values of the resistors $R_6$ and $R_7$, and the level of the output signal of the circuit 15 varies along a curve A shown in FIG. 4. However, when the noise signal reaches a level so high as to disturb the stereophonic reproduction, for example, the level $n_1$, the emitter potential of the transistor $Q_9$ is high enough to cause the transistor $Q_{10}$ to conduct. When the transistor $Q_{10}$ conducts, the resistors $R_7$ and $R_8$ are connected in parallel with each other and the combined resistance value is less than that of the resistor 7, alone. Consequently, the gain of the circuit 15 increases and the level of the output signal varies along a curve B in FIG. 4. As a result, the output of the circuit 15 also increases, so that even if the noise level in the composite signal becomes lower than $n_1$, the transistor $Q_{10}$ remains conductive. When the noise level drops to $n_2$, the transistor $Q_{10}$ becomes nonconductive, which decreases the gain of the circuit 15 again, and the level of the output signal returns to operation along the curve A. Thus, the circuit 15 may be said to have a hysteresis characteristic. Accordingly, by providing a waveform shaping circuit in the receiver in FIG. 1, for example, a Schmitt circuit 16 having a set level $e_1$ shown in FIG. 4 at a stage subsequent to the circuit 15, even if the output level of the circuit 15 varies between the level $n_2$ at which noise disturbs stereophonic reproduction and the level $n_1$ at which noise does not disturb the stereophonic reproduction, the Schmitt circuit 16 can always be held, for example, conductive and its output signal can be obtained as the second gate signal $S_2$.

The first and second gate signals $S_1$ and $S_2$ thus produced by the circuits 12 and 15 are supplied to the gate circuit 13. The gate circuit 13 is adapted to produce a gated output only when supplied with the first gate signal $S_1$, i.e., when the incoming signal is strong enough for stereophonic reproduction. However, even in that case, the gate circuit 13 will not provide a gated output if the noise level is sufficiently high to produce the second gate signal $S_2$. Of course, a weak signal having a high noise content will cause only the second gate signal $S_2$ to be produced, and this will not cause the gate circuit to produce gated output. Since the gate circuit 13 may be a conventional one, its detailed circuit construction will now be described.

The gated output signal thus obtained is supplied to the switching circuit 5 and the doubler circuit 11 to put the receiver in the stereophonic mode of operation. In the absence of the gated output signal, the receiver is switched to the monaural mode of operation.

With the present invention, the gate circuit 13 responds to a stereophonic broadcasting signal of good quality by establishing an optimum condition for the reception of the stereophonic broad-casting signal. Only when the gate circuit 13 produces an output signal is the receiver automatically switched to the stereophonic mode of operation as has been described in the foregoing. Therefore, it is possible to reproduce a stereophonic broadcasting signal when the field strength of the received input exceeds a predetermined value and no noise is mixed in.

If stereophonic reproduction is continued in the presence of beat interference or signal noise, the reproduction is greatly affected by the beat interference or the noise. With the present invention, however, the receiver is automatically switched to the monaural mode of operation immediately. Accordingly, the present invention alleviates the influence as previously referred to, which thereby ensures minimization of the interference and noise in the reproduced sound.

The hysteresis characteristic of the circuit 15 ensures stable switching operation from the monaural to stereophonic mode of operation or vice versa. If the circuit 15 does not have a hysteresis characteristic, the receiver would be switched to the monaural mode of operation at the level $n_1$, which is the minimum noise signal level to be undesirable for stereophonic reproduction. As soon as the noise dropped below the level $n_1$, the receiver would be switched again to the stereophonic mode of operation. Accordingly, if noise signals of such a critical value were received continuously, the receiver would be continually changing back and forth between the monaural and stereophonic modes and would give a bad impression to the listener. In the present invention, however, the noise signal detecting circuit has the aforementioned hysteresis, so that once a noise signal of a level exceeding $n_1$ has arrived, the receiver continues to operate in the monaural mode unless the subsequent noise signal drops a significant amount, to the level $n_2$ which does not ever disturb stereophonic reproduction. The noise level does not vary from a value above the level $n_1$ to a value below the level $n_2$ so frequently, and, therefore, the listener is not subjected to the annoyance of a change from monaural to stereophonic reproduction too often.

By providing a switch SW such as shown in FIG. 1, the aforementioned automatic switching operation can be selectively achieved at will.

It will be apparent that many modifications and variations may be effected without departing from the scope of the novel concepts of this invention.

What is claimed is:

1. In an FM stereophonic receiver having an intermediate-frequency amplifier, an FM discriminator and a monaural-to-stereophonic switching means, said receiver comprising:

A. Means for extracting from the output of said intermediate-frequency amplifier an intermediate-frequency signal having a narrower frequency band than that of said intermediate-frequency amplifier;

B. Means for producing a first gate signal only if the extracted narrow band intermediate-frequency signal exceeds a predetermined amplitude;

C. Noise signal detecting means for detecting a noise signal in the output from said FM discriminator and providing an output signal above a predetermined level when the detected noise signal rises above a first noise level and, thereafter, until said detected noise signal falls below a second relatively lower noise level, said noise signal detecting means including a band pass filter connected with said output of the FM discriminator, and a rectifier circuit having a rectifying transistor connected to the output side of said band pass filter, a transistor amplifier connected to the output of said rectifying transistor, an integrating circuit connected to the output of said transistor amplifier and a feedback circuit for feeding the output of said integrating circuit back to the rectifying transistor;

D. Means for producing a second gate signal if said output signal from said noise signal detecting means is above said predetermined level; and E. Means for controlling said monaural-to-stereophonic switching means by said first and second gate signals so as to effect stereophonic operation of the receiver only when said first gate signal exists in the absence of said second gate signal.

2. An FM stereophonic receiver as claimed in claim 1, wherein said feedback circuit comprises:

A. A switching transistor;

B. A series circuit comprising a first resistor connected in series with said switching transistor between the emitter of said rectifying transistor and ground, said switching transistor being controlled by the output of the integrating circuit; and C. A second resistor connected in parallel with said series circuit.

* * * * *